July 2, 1963 W. FLIEG 3,096,016

DATA RECORDER

Filed April 12, 1961 11 Sheets-Sheet 1

INVENTOR.
WERNER FLIEG

BY Alan K. Roberts

ATTORNEY

INVENTOR.
WERNER FLIEG
BY Alan K. Roberts
ATTORNEY

DATA RECORDER

Filed April 12, 1961 11 Sheets-Sheet 3

INVENTOR.
WERNER FLIEG
BY Alan K. Roberts
ATTORNEY

July 2, 1963 W. FLIEG 3,096,016

DATA RECORDER

Filed April 12, 1961 11 Sheets-Sheet 4

INVENTOR.
WERNER FLIEG
BY [signature]
ATTORNEY

July 2, 1963 W. FLIEG 3,096,016

DATA RECORDER

Filed April 12, 1961 11 Sheets-Sheet 5

INVENTOR.
WERNER FLIEG

BY [signature]

ATTORNEY

July 2, 1963 W. FLIEG 3,096,016

DATA RECORDER

Filed April 12, 1961 11 Sheets-Sheet 6

INVENTOR.
WERNER FLIEG

BY Frank K. Roberts

ATTORNEY

July 2, 1963

W. FLIEG

DATA RECORDER 3,096,016

Filed April 12, 1961

11 Sheets-Sheet 7

INVENTOR.
WERNER FLIEG
BY
Alan K. Roberts
ATTORNEY

INVENTOR.
WERNER FLIEG
BY [signature]
ATTORNEY

INVENTOR.
WERNER FLIEG
BY
ATTORNEY

INVENTOR.
WERNER FLIEG
BY
ATTORNEY

July 2, 1963 W. FLIEG 3,096,016

DATA RECORDER

Filed April 12, 1961 11 Sheets-Sheet 11

INVENTOR.
WERNER FLIEG

BY

ATTORNEY 3,096,016
Patented July 2, 1963

3,096,016

DATA RECORDER

Werner Flieg, Brookline, Mass., assignor to Invac Corporation, Waltham, Mass.

Filed Apr. 12, 1961, Ser. No. 102,478
4 Claims. (Cl. 234—108)

This invention relates to apparatus for processing record media such as paper tapes and the like, and more particularly to apparatus for recording data such as by the punching of holes in said media. This application is a continuation-in-part of my application, Serial No. 69,220, filed November 14, 1960, issued as Patent No. 3,032,163, dated May 1, 1962, which in turn is a continuation-in-part of my application Serial No. 4,781, filed January 26, 1960, now abandoned.

Heretofore, data input equipment for recording data on record media has involved the use of complicated and costly components having comparatively short life.

It is an object of the invention to provide improved data recording apparatus constituted by simple inexpensive components which are remarkably reliable in use and which are adapted for the efficient recording of data such as by punching holes in a a paper tape and the like.

It is a further object of the invention to provide an improved punch having uniquely operated punching pins.

Still another object of the invention is to provide an improved tape stepping device.

Yet another object of the invention is to provide means for insuring the withdrawal of punching pins from a record medium following a punching operation.

Another object of the invention relates to providing an improved data recording system or data input apparatus for use with computors and the like.

A still further object of the invention is to provide an improved paper tape punch adapted for use with a typewriter keyboard or universally with any type of keyboard capable of encoding data in binary electrical form.

Still another object of the invention is to provide for operating a paper punch without the use of rotary power sources, such as electric motors.

To achieve the above and other of its objectives, the invention contemplates, in accordance with a preferred embodiment thereof, the driving of punching pins by means electromechanically generating rectilinear forces. Such means may be constituted for example, by solenoids or the like which are inexpensive and readily replaced. Such means are, moreover, of relatively small size and can be conveniently positioned to form a composite unit of relatively small size.

According to a further particular aspect of the invention, solenoids and the like may be employed to prevent interference between punching pins and the associated record medium as the latter is being advanced for the storing of additional data. To this end, the invention provides a position restoring unit for said pins whereby the latter are returned positively to a position of rest.

In accordance with a further aspect of the invention, a simple rectilinear drive is provided with means to convert this drive into a force for transporting a record medium for data recording purposes.

Advantageously, apparatus provided in accordance with the invention is readily constructed by the use of mass production techniques and with inexpensive components whereby the cost to the consumer is significantly reduced.

Other objects, advantages and features of the invention will be apparent from the following detailed description as illustrated by the accompanying drawing in which:

FIGURE 1 shows pictorially a paper tape punch provided in accordance with the invention;

FIGURE 2 diagrammatically illustrates a system in which the invention finds application;

Figure 1:
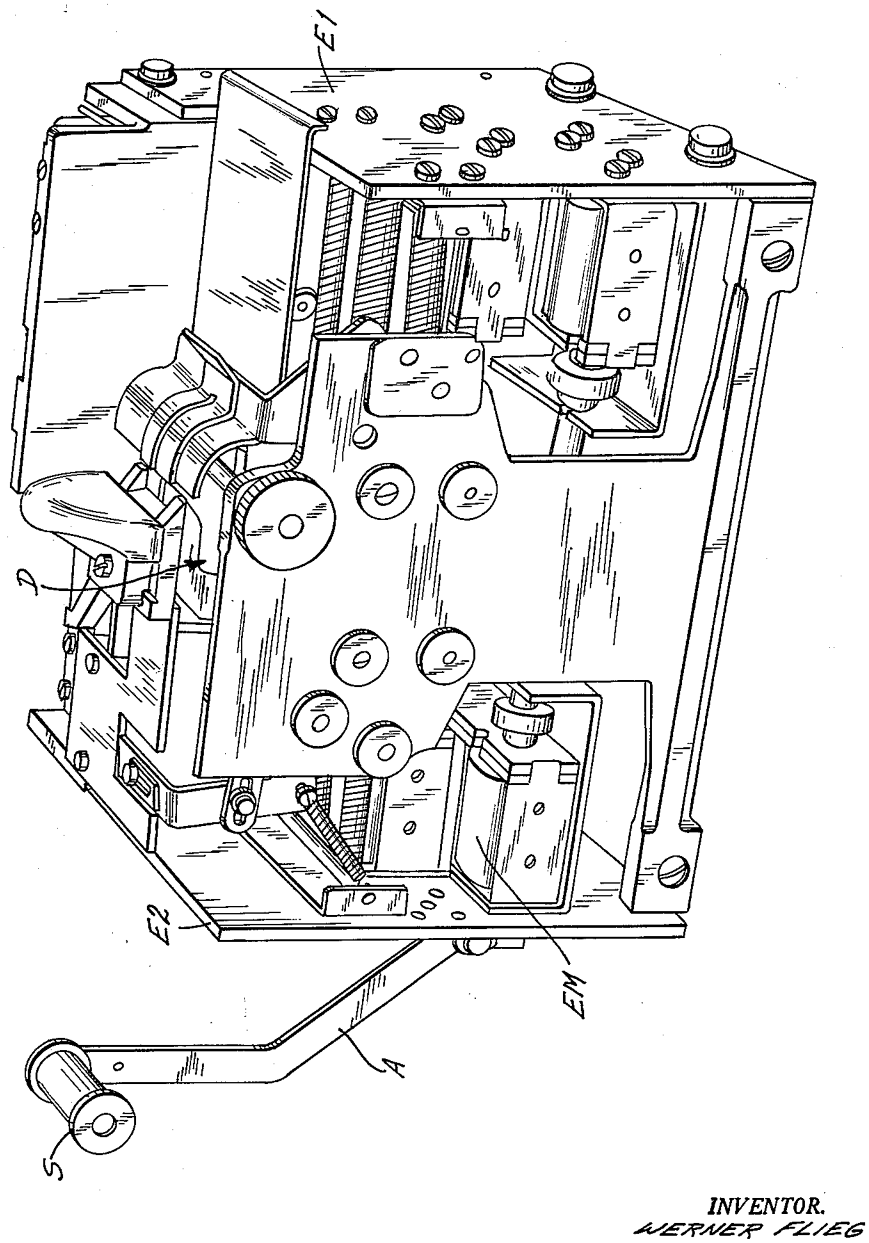

A paper tape punch mechanism, provided in accordance with the invention, is pictorially illustrated in FIG. 1 with the front covering plate thereof removed to expose part of the internal structure of the mechanism.

In FIG. 1 the paper tape punch is generally illustrated as comprising end plates E1 and E2, end plate E2 supporting a spool S on a tape tensioning arm A. Spool S is adapted for supporting and guiding paper tape which is supplied to the punching mechanism.

Also shown in FIG. 1 is the die assembly D and electro-mechanical devices or solenoids EM.

Figure 2:
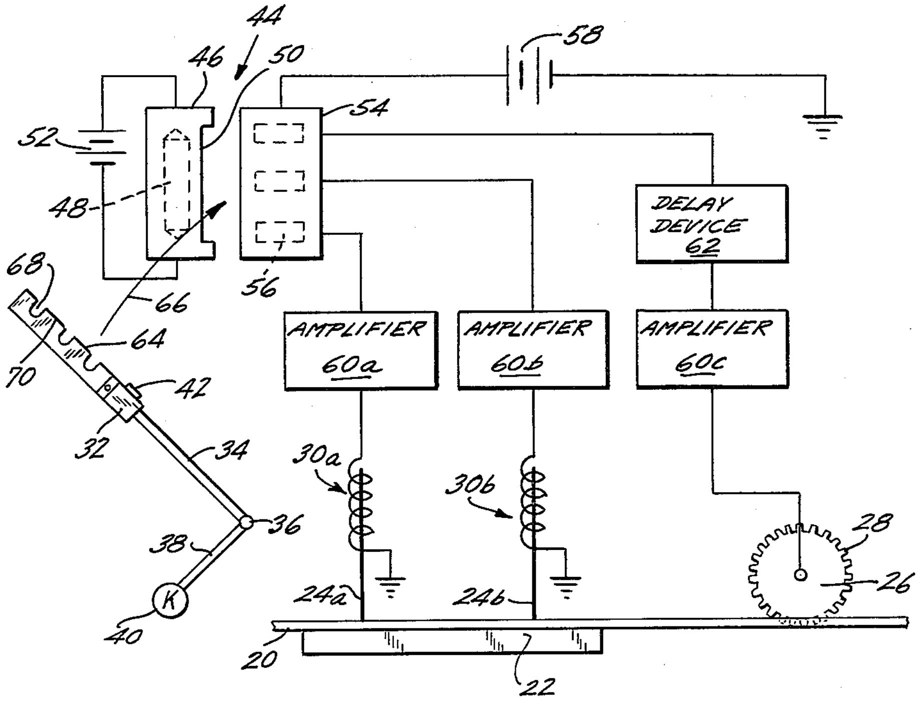

In FIG. 2 a paper tape 20 supported on a punch die 22 is selectively punched by means of pins 24, of which only pins 24*a* and 24*b* are shown. The tape is stepped or driven past pins 24 by a sprocket wheel 26 provided with peripheral teeth 28.

Pins 24*a* and 24*b* are respectively controlled by solenoids or electromagnetic devices 30*a* and 30*b* and solenoids 30 are, in turn, controlled as will be hereinafter indicated.

At 32 is illustrated a type bar of a conventional typewriter. This type bar 32 is mounted on a lever 34 pivotally supported on pivot 36 and actuated through the intermediary of a lever 38 by means of an operating key 40. On the effective face of type bar 32 is provided a raised section 42 constituting a character. Two characters 42 may be provided if desired.

The above typewriter structure is of a conventional nature and the details required therefore will be apparent to those skilled in the art.

However, there is additionally provided a unit 44 comprising a source of radiated energy and means responsive to this radiated energy. As will be shown, the positioning of a masking device between said source and the means responsive thereto in accordance with the operation of the typewriter controls the punching of tape 20.

More particularly, there is provided a housing 46 internally accommodating a light source or incandescent bulb 48 adapted to radiate light through opening 50. A power source 52 provides the necessary electrical power for operating this bulb. Opposed to the light source 48 is a housing 54 within which are accommodated a plurality of photo-sensitive elements 56, the number of which depends upon the code being employed with respect to punching the tape 20.

Preferably, the photo-sensitive elements 56 are hermetically sealed-in-glass high-sensitivity junction photo diodes having a built-in lens which focuses light on the sensitive portion of the junction. A commercially available photo diode is Sylvania type 1N77A.

The photo-sensitive elements 56 are employed to control a D.C. voltage provided by a voltage source 58 and an interruption of the light radiated by incandescent bulb 48 with respect to elements 56 will give rise to pulses or voltage changes which are employed to operate solenoids 30 and sprocket wheel 26.

By reason of the low magnitude of the pulses or signals generated by elements 56, amplifiers 60*a–c* are employed. These amplifiers may be conventional D.C. amplifiers which suitably magnify the amplitude of the signals generated by elements 56.

The operations of pins 24 and sprocket wheel 26 are staggered or sequenced. Thus pins 24 selectively punch tape 20, whereafter the tape 20 is stepped to the next position by means of sprocket wheel 26. To provide for this sequencing of operations, a conventional delay device 62 is provided in series with amplifier 60*c* so that the signal actuating sprocket wheel 25 is delayed with respect to the signal actuating pins 24.

On type bar 32 is mounted a masking element or plate 64. Plate 64 is rigidly connected with type bar 32 and moves with the latter in the direction indicated by arrow 66 to a position between light source 48 and light-sensitive elements 56. Plate 64 is provided with openings 68 according to a predetermined code so that elements 56 are selectively shielded from light source 48 in accordance with which of the masking elements 70 is between the openings 68. Each type bar 32 is provided with one or more respective characters 42 which are correlated with the code of the openings provided on plate 64.

Figure 3:
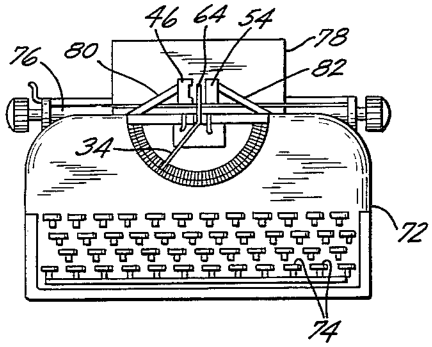
FIGURE 3 illustrates a typewriter for generating signals by which said paper tape punch is operated.

FIG. 3 illustrates a conventional typewriter 72 provided with keys 74 equivalent to key 40 in FIG. 1. Typewriter 72 is moreover provided with a roll or platen 76 around which a sheet 78 of paper is wound for a conventional typing operation. Elements 54 and 46 are mounted in position by brackets 80 and 82, these brackets being located upon a stationary portion of the typewriter. A plate 64 is shown in FIG. 3 positioned between members 46 and 54 for the control of a tape punching operation. Also illustrated in FIG. 3 are a plurality of levers 34 arranged in conventional manner.

Figure 4:
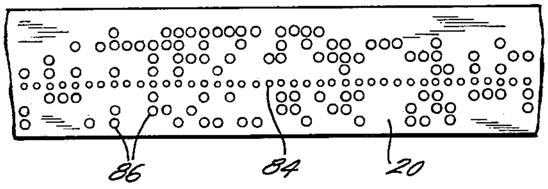
FIGURE 4 illustrates a punched paper tape having data encoded therein.

FIG. 4 illustrates tape 20 provided conventionally with a row of small sprocket holes 84 and with a number of larger holes 86 which are punched by pins 24. In the most generally employed commercial arrangement pins 24 will be arranged transverse to the longitudinal direction of tape 20 and when the tape is stepped sequential code groups will be punched into the tape.

Figure 5:
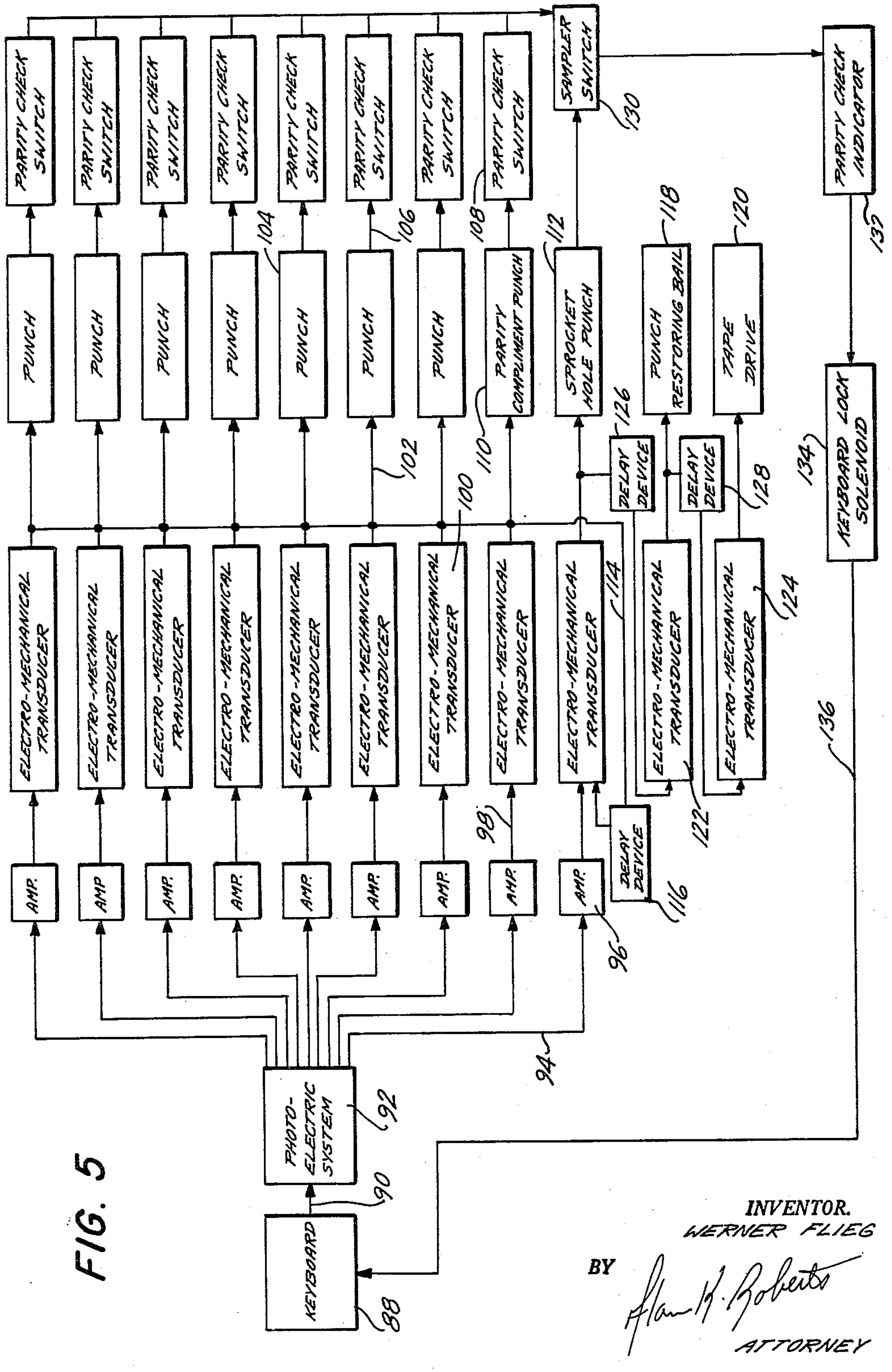
FIGURE 5 illustrates in greater detail, but still diagrammatically, a system in which the invention is employed.

FIG. 5 illustrates in greater detail a system in which the paper tape punch of the invention may be employed. This system is photoelectrically actuated as has been noted above. It comprises, generally, a keyboard 88 mechanically linked as indicated by coupling line 90 to a photoelectric system 92, the latter supplying pulses or signals via lines 94 to amplifiers 96. The amplifiers 96, in turn, supply signals via lines 98 to electromechanical transducers 100.

The electromechanical transducers 100 are mechanically coupled together via mechanical linkages 102 to punches 104. Punches 104 may be mechanically or electrically connected by means of lines 106 to parity check switches 108.

Also illustrated in the diagram of FIG. 5 is the parity complement punch 110 and sprocket hole punch 112.

It will be noted that there is an electromechanical transducer 100 directly feeding into sprocket hole punch 112. This transducer may be actuated, for example, by a spacer key (not shown) in the keyboard 88 operating through the photoelectric system 92 and the associated amplifier 96. Additionally, said electromechanical transducer is provided with a signal via line 114, which signal results from actuation of any of the punches 104 by the associated electromechanical transducers 100. This means that the sprocket hole punch 112 will be actuated to punch a sprocket hole in the associated paper tape following the recording of data on said paper tape by the punching of holes therein.

It can be assumed that the inherent delay in the operation of electromechanical transducers 100 will provide for sequencing of the operation of the sprocket hole punch. Diagrammatically, however, delay device 116 is indicated to insure the proper sequencing.

Additionally, as will be shown in greater detail hereinafter, there is provided a punch restoring bail 118 and a tape drive 120. Punch restoring bail 118 is actuated by an electromechanical transducer 122 and tape drive 120 is actuated by an electromechanical transducer 124.

To account for the possibility that the transducer 122 may not be properly sequenced to operate after a sprocket hole has been punched, there is incorporated into the circuit of transducer 122 delay device 126. Similarly, there is incorporated into the circuit of electromechanical transducer 124 a delay device 128.

It is to be noted that delay devices 116, 126 and 128 are incorporated into the system for purposes of illustration only inasmuch as the inherent electrical and mechanical delays in the system will provide sufficient delay. Nevertheless, if found necessary in the practice of the invention, these delay devices may be any of the well known conventional delay devices readily available to those skilled in the art.

Additionally illustrated in the system of FIG. 5 is a sampler switch 130 and a parity check indicator 132 feeding into a keyboard lock solenoid 134 connected by line 136 to keyboard 88.

Assuming that a key in keyboard 88 has been depressed, photoelectrical system 92 will respond by selectively sending signals via amplifiers 96 to electromechanical transducers 100 which, in turn, will actuate corresponding punches 104, the result being the punching of holes in the associated paper tape.

Sequentially an electrical signal fed via line 144 and delay device 116 will actuate the electromechanical transducer associated with sprocket hole punch 112, thus resulting in the punching of sprocket holes in said paper tape.

Next following this action, electromechanical transducer 122 will actuate the punch restoring bail to assure that the pins of punches 104 are restored to a position of rest, as will be shown, in order to avoid tearing said paper tape as the same is stepped to the next position.

Following the restoring of said pins to their respective positions of rest, electromechanical transducer 124 will actuate the tape drive 120 which, as will be shown, will engage the sprocket holes punched in the tape in order to drive the latter.

While the above action is proceeding, parity check switches including that switch coupled to the parity complement punch 110, will supply parity check information to sampler switch 130 which acts as a gate controlled by sprocket hole punch 112. On actuation of the sprocket hole punch 112, switch 130 transmits its information to parity check indicator 132 and, if invalid information is indicated, indicator 132 actuates solenoid 134 to lock keyboard 88, this action indicating to the operator of keyboard 88 that an error has occurred.

Reference is next made to the remaining figures of the drawing for the disclosure of a paper tape punch provided in accordance with a preferred embodiment of the invention.

In FIGS. 6–9 for purposes of orientation of these figures with the pictorial view of FIG. 1, attention is directed to end plates E1 and E2. Extending between these end plates is a base plate 138 and side plates 140 and 142. A top plate 144 is visible in FIG. 6.

In this latter figure is visible the die mechanism D (see also FIG. 1).

Figure 11:
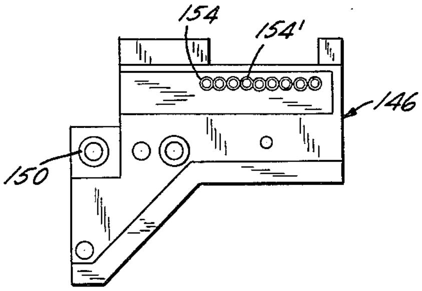
FIGURE 11 is a top view of an upper die section employed in the above noted punch.
Figure 12:
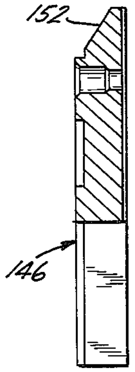
FIGURE 12 is a side view, partially in section, along line XII—XII of FIG. 11 of said upper die section.
Figure 13:
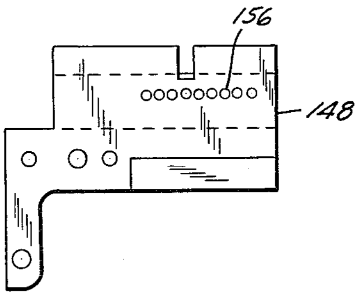
FIGURE 13 is a plan view of a lower die section employed in the punch of the invention.
Figure 14:
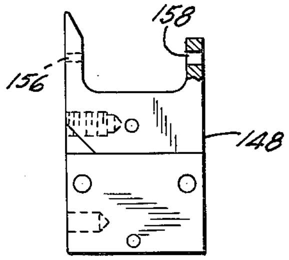
FIGURE 14 is a side view, partially broken away, of the lower die section of FIG. 13.

Die mechanism D consists of an upper die section 146 (see also FIGS. 8, 11 and 12) and a lower die section 148 (see also FIGS. 13 and 14).

The upper die section 146 is a generally flat, metallic member provided with a number of holes 150, whereby said section is mounted on the top plate 144 of the punch. Section 146 is further provided with a ramp or sloping section 152 adjacent which is provided a plurality of die holes 154 arranged in rectilinear alignment, all of said holes being arranged in parallel. One of the holes 154, such as the hole 154′, may be slightly smaller than the other of these die holes which are of equal diameter, the smaller hole corresponding to the sprocket hole pin for punching sprocket holes in the paper tape.

Figure 6:
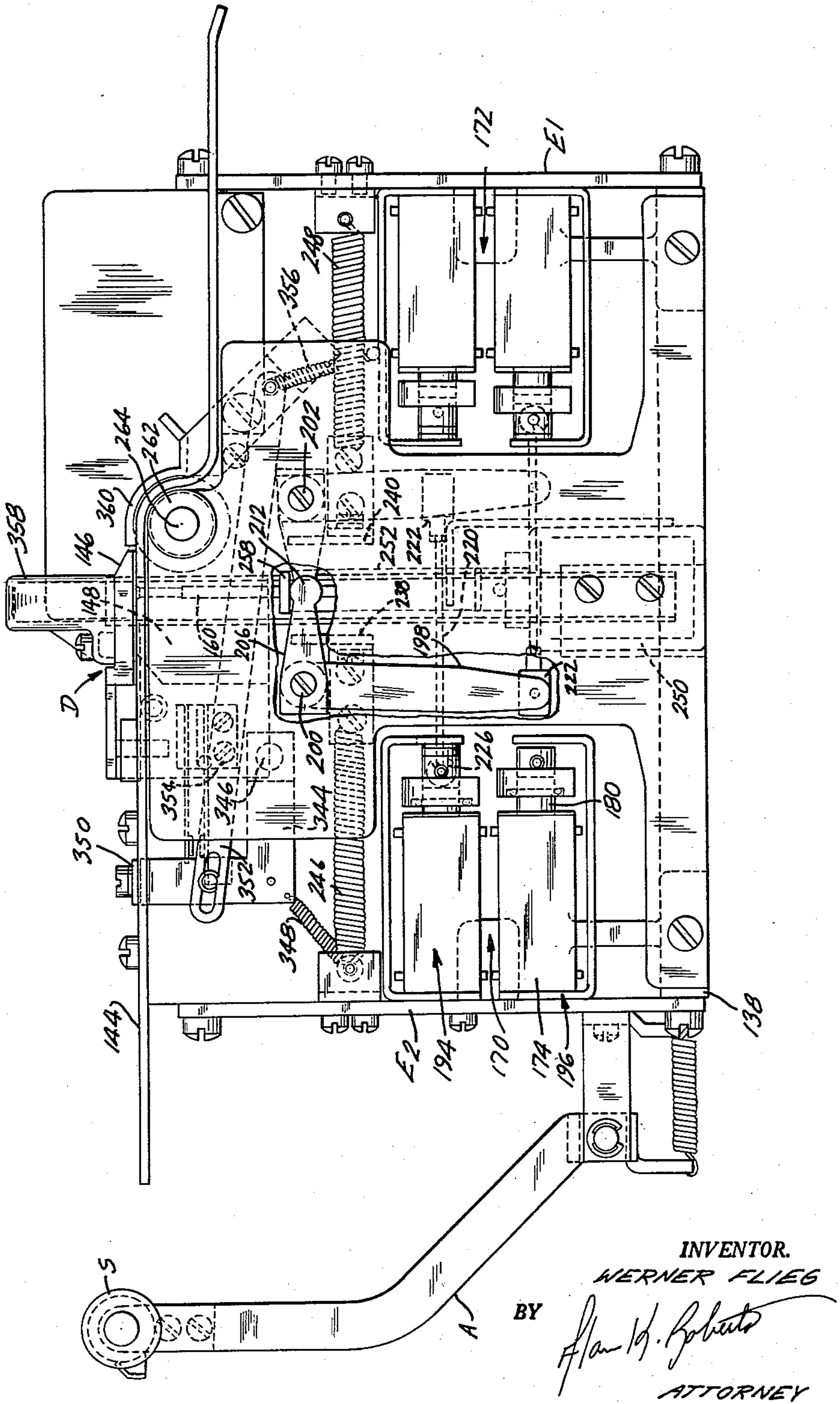
FIGURE 6 is a side view of the paper tape punch provided in accordance with the invention, with one of the side plates removed therefrom to expose the internal construction of the punch.

Lower die section 148 (FIGS. 13 and 14) defines a rectilinear alignment of die holes 156 corresponding to the above noted die holes 154 and further defines an alignment of holes 158 which are coaxially aligned with die holes 154 and 156, the holes 158 being adapted for guiding the punching pins 160 as illustrated in FIG. 6.

Figure 15:
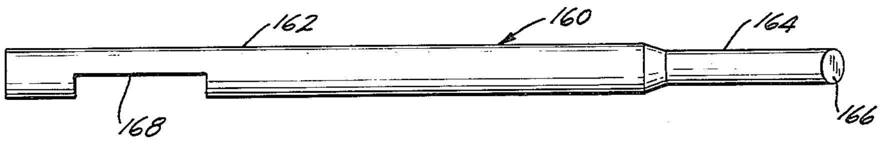
FIGURE 15 is a side view of a punching pin employed in the apparatus of the invention.

A typical punching pin 160 is more particularly illustrated in FIG. 15. In FIG. 15 is illustrated an elongated, generally cylindrical member made, for example, of steel. This elongated member, constituting a punching pin 160, includes a first section 162 coaxial with and connected to a second section 164 of smaller diameter.

Section 164 is provided with a sloped cutting tip or edge 166, whereas section 162 is provided with a lateral opening or slot 168 which serves a purpose hereinafter indicated in greater detail.

As will also be shown in greater detail in the description which follows hereinafter, a vertical displacement of pins 160 selectively upwards through the corresponding die holes is effected in a manner which is unique to the apparatus of the invention.

Pins 160 are arranged in parallel and cooperatively define a vertical plane. On opposite sides of this plane are respectively aligned banks 170 and 172 of solenoids 174.

Figure 16:
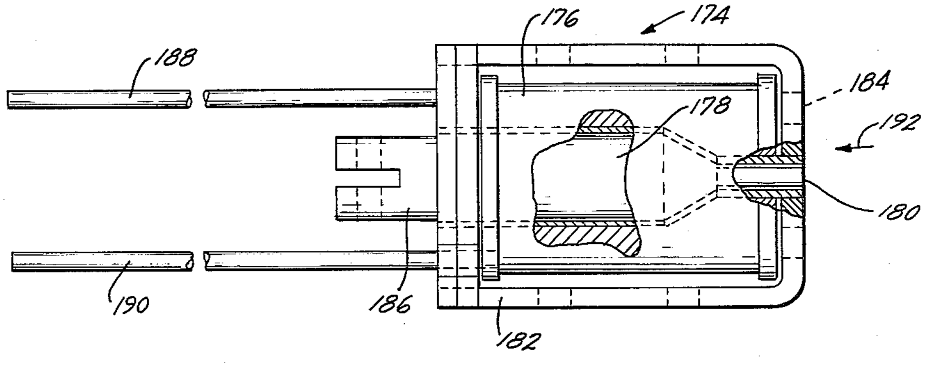
FIGURE 16 is a side view, partially broken away, of a solenoid employed in the paper tape punch of the invention.
Figure 17:
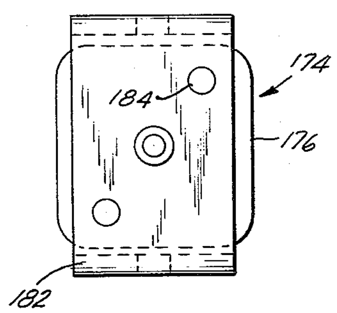
FIGURE 17 is an end view of the solenoid of FIG. 16 showing the bracket therefor.

Solenoids 174 are of commercially available type and, as shown in FIGS. 16 and 17, each solenoid includes a winding 176 and an armature 178, the armature being provided with an extension or rod 180, which is in part removed when the solenoid is mounted and being adapted for transmitting a rectilinear mechanical force by means of which the pins 160 are operated, as will be shown.

Additionally, solenoids 174 are supported in mounting brackets 182 suitably provided with holes 184 by means of which the brackets are connected to the end plates. Members 186 provide for mechanical connection to the armatures as will be seen.

Each winding 176 is provided with a pair of leads 188 and 190 by means of which a signal is applied to the associated winding. On application of a signal to winding 176, the corresponding rod 180 is drawn by the associated armature 178 in the direction indicated by arrow 192. It is to be noted that leads 188 and 190 are not shown in FIGS. 6–8 for purposes of clarity.

Solenoids 174 may be considered as being electromechanical transducers adapted for converting an electrical signal into a rectilinear mechanical force as aforesaid. The solenoids are adapted for producing a force of this type for controlling each of pins 166.

Figure 7:
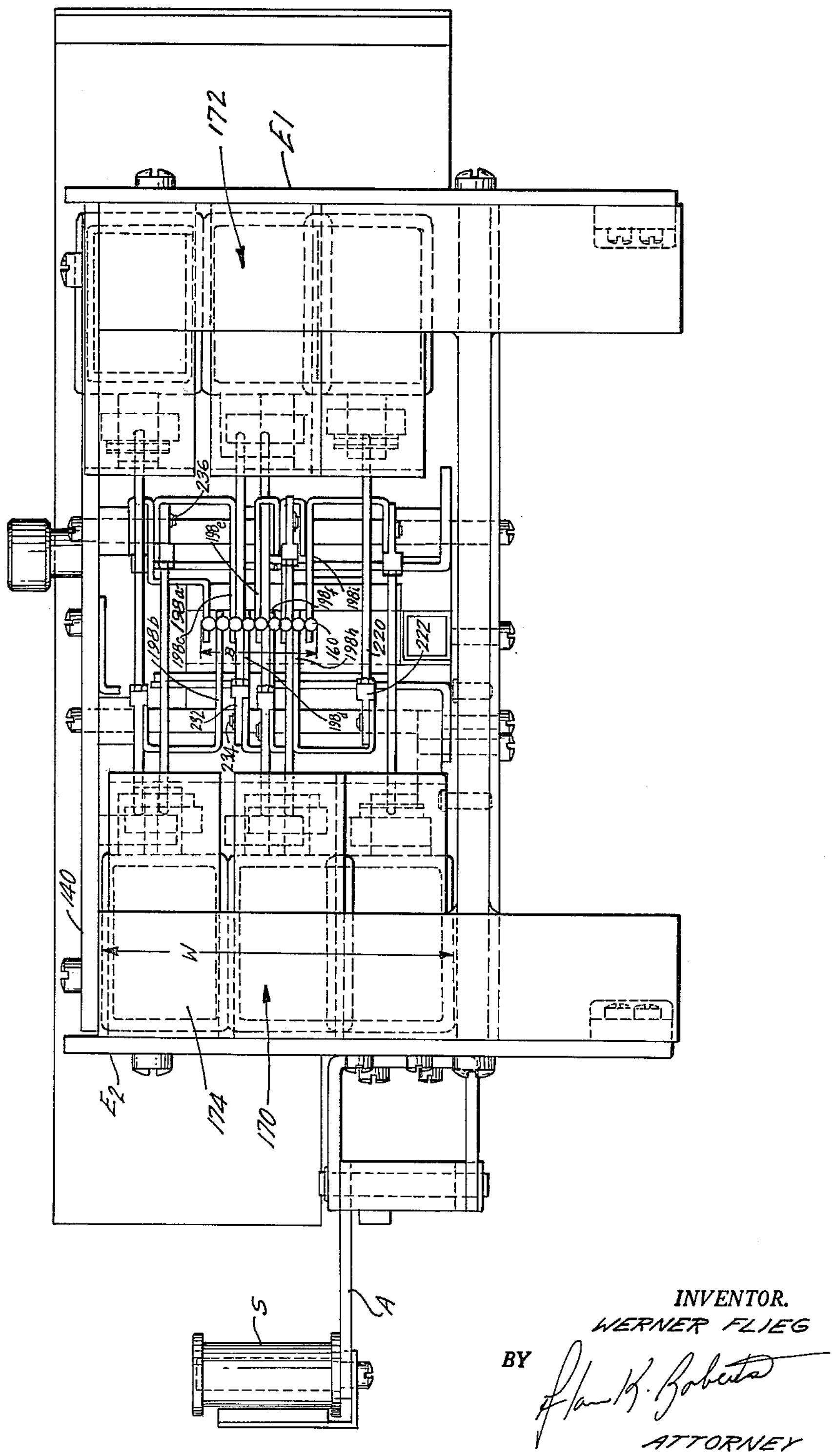
FIGURE 7 is a top view of the punch with the top plate and associated components removed to expose the internal construction of the device.
Figure 8:
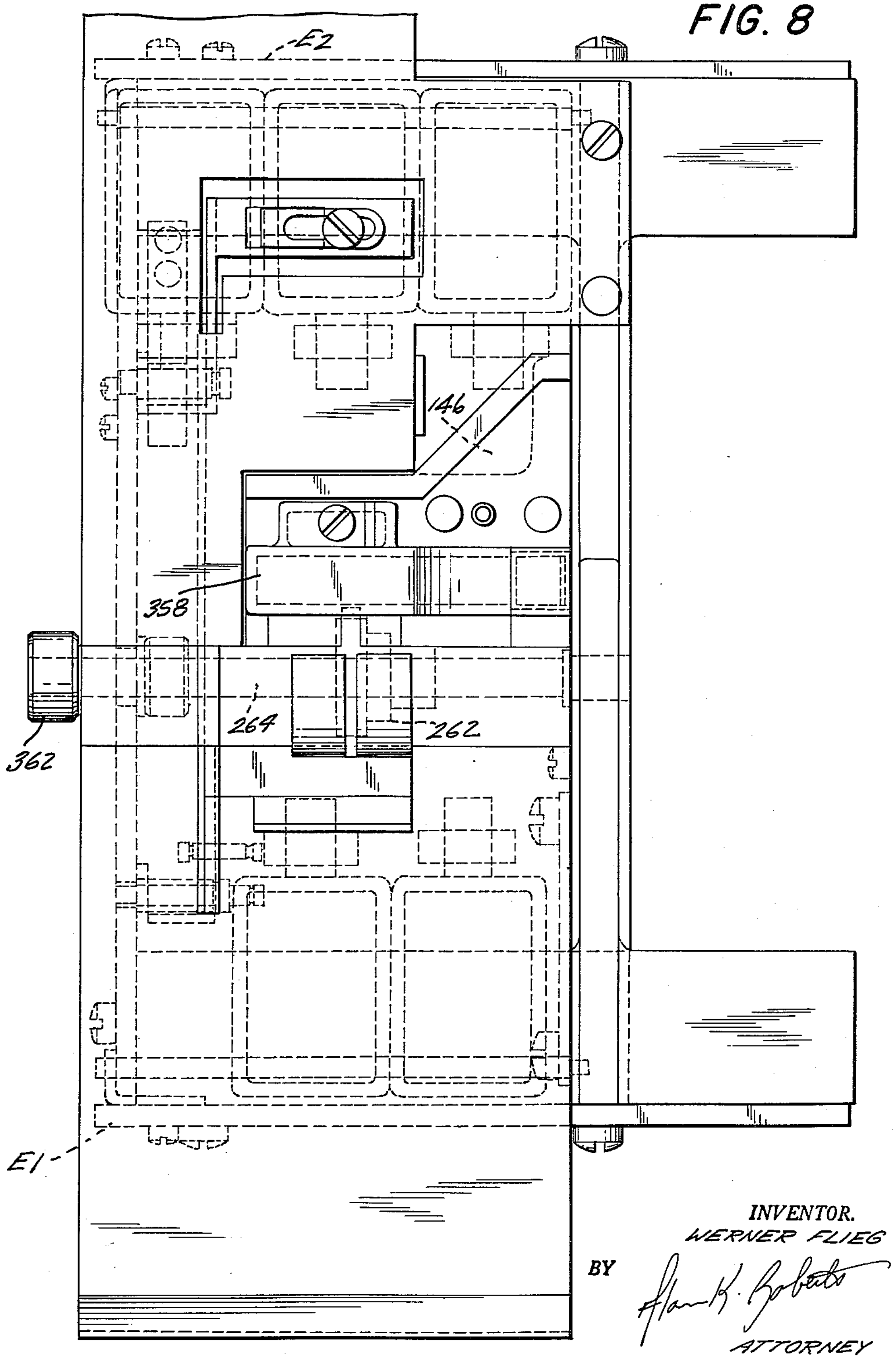
FIGURE 8 is a top view of the punch of FIG. 6 with the top plate and associated components in position.

It will be noted that solenoids 174 may appropriately be arranged in vertically stacked layers such as indicated at 194 and 196. As best seen in FIG. 7, a plurality of solenoids 174 may be aligned in each layer as required.

A linkage system is provided for purposes of converting the mechanical force generated by solenoids 174 into forces which can be appropriately applied to the pins 160. A principal component of this linkage system is constituted by pivoted hammers or levers 198. As best seen in FIG. 7, the breadth B of the alignment pins 160 is significantly less than the width W of the associated alignments of solenoids. According to a feature of the invention, the hammers, in addition to operating the pins 160, further function as adapters to account for the disparity of dimensions B and W.

In FIG. 7, hammers 198 have been assigned letter suffixes for purposes of distinguishing hammers of different shapes. Thus, for example, the structure illustrated in FIG. 7 includes hammers 198*a*—198*i*.

The hammers 198 are arranged in two arrays, each associated with one of the banks 170 or 172 of solenoids 174. The hammers of each array are respectively supported on shafts 200 and 202, which are supported on the side plates of the casing.

Figure 18:
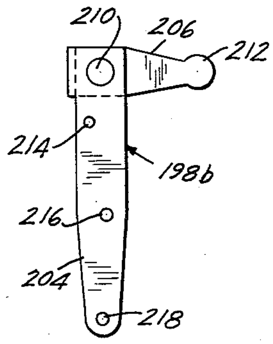
FIGURE 18 is a side view of a linkage element employed in the punch of the invention.
Figure 19:
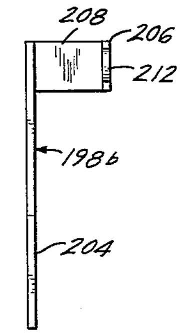
FIGURE 19 is a front view of the linkage element of FIG. 18.
Figure 20:
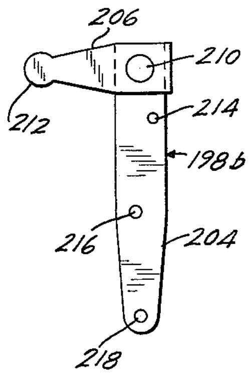
FIGURE 20 is a view taken from the side opposite to that illustrated in FIG. 18.

FIGS. 18–20 illustrate, by way of example, the details of hammer 198*b*, the other of said hammers varying slightly as to form and as to dimension.

The hammer illustrated in FIGS. 18–20 consists of spaced and perpendicular arms or sections 204 and 206. Connecting arms 204 and 206 is an intermediate member 208 (FIG. 19), the purpose of which is to rigidly connect arms 204 and 206 in spaced relationship. Arms 204 and 206 are provided with corresponding holes indicated at 210 whereby the hammer is mounted on one of shafts 200 or 202 (FIG. 6).

Arm 206 is provided with a circular disc-like terminal portion 212, the purpose of which is to drive the associated pin 160. For this purpose the circular portions 212 of the various hammers are accommodated in lateral openings 168 (FIG. 15) provided in section 162 of punching pins 160.

Hammers 198 may also be provided with one or more holes 214, 216 and 218 by means of which the hammers are attached or coupled to solenoids 174.

Figure 21:
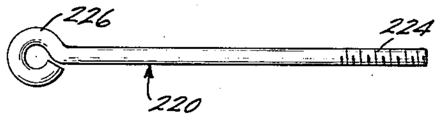
FIGURE 21 illustrates a further linkage element employed in the punch of the invention.
Figure 22:
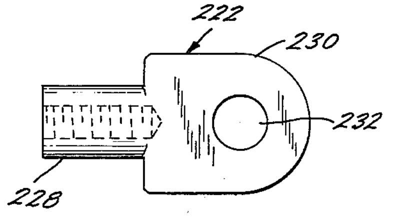
FIGURE 22 illustrates, in side view, a connecting element engageable with the linkage element of FIG. 21.
Figure 23:
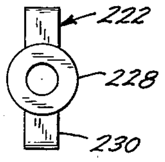
FIGURE 23 illustrates an end view of the connecting element of FIG. 22.

For connecting the hammers to the solenoids, rods 220 and turnbuckles 222 are employed, the details of rods 220 and turnbuckles 222 being shown respectively in FIG. 21 and in FIGS. 22 and 23.

The linkage element illustrated in FIG. 21 consists of an elongated rod 220 having a thread 224 at one end thereof and a loop or eye 226 at the other end thereof.

Connecting element or turnbuckle 222, as shown in FIGS. 22 and 23, comprises a threaded collar 228 and a flattened portion 230 connected thereto. In flat portion 230 is provided a hole 232.

As best seen in FIGS. 6 and 7, the flat portions 230 of connecting elements 222 are connected by means of pivot pins 234 with hammers 198 and, more particularly, pins 234 engage in one of the holes 216 or 218 (FIGS. 18–20), according to the height of the associated solenoid 174. In turn, the threaded collar 228 of each connecting element 222 is threadably engaged with the threaded end 224 of the associated rod 220, the eye 226 thereof being pivoted to the corresponding rod 180 of the associated solenoid 174 by means of a pivot pin 236. It will be appreciated that each rod 220 is thus pivotally connected to the associated solenoid and to the associated hammer. Further, it will be noted that the threaded engagement between an end 224 and the related collar 228 enables an adjustment of the associated punching pin.

Figure 24:
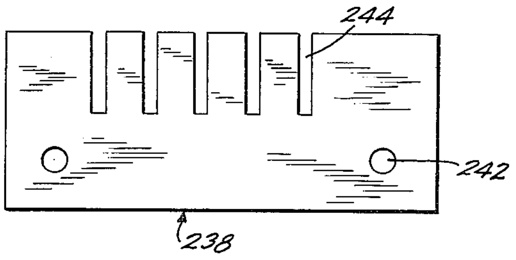
FIGURE 24 is a plan view of a guide element employed in the said punch.

Arms 206 of hammers 198 are further provided with guides in the form of combs 238 and 240 which are mounted between the side walls of the casing of the punch. The details of these combs are best seen in FIG. 24, wherein comb 238 is shown by way of example.

Comb 238 consists of a flat plate having mounting bracket holes 242 provided therein and being provided further with vertically aligned parallel slots 244, the width of which corresponds to the thickness of hammers 198. Arms 206 of hammers 198 ride freely up and down in the said slots.

Although the details of the punch of the invention have not yet been completely described in detail, the operation of that portion which has been described before will next be indicated before further disclosure of the details of the punch ensues.

Actuation of a solenoid 174 draws the associated rod 180 into that solenoid and carries along with the same the eye 226 of the associated rod 220. This rectilinear mechanical force is applied by means of the associated turnbuckle 222 to the associated hammer 198 which is thus pivoted on the associated shaft 200 or 202. The arm 206 of this hammer pivots upwardly and by reason of the accommodation of its circular end portion 212 in the corresponding slot in the corresponding pin 160 this pin is raised upwardly so that the tape passing between these sections is appropriately punched.

Hammers 198 are loaded by springs 246 and 248 which urge these hammers and therefore the pins to a normal position of rest. In conventional types of punches, however, it sometimes occurs that the punching pins are bound in the holes which they have punched, the pins thus remaining in "active" position whereupon movement of the paper tape causes the same to tear. According to a further feature of the invention, this problem is positively avoided by incorporating into the punch a punching pin restoration mechanism.

As can be seen in FIG. 6, the invention contemplates the provision of a further solenoid 250, this solenoid having the same general construction as the solenoids 172 and in certain cases having the same electrical and mechanical parameters. Connected to and operated by solenoid 250 is a restoring bail 252, the details of which are best seen in FIGS. 25 and 26.

Figure 25:
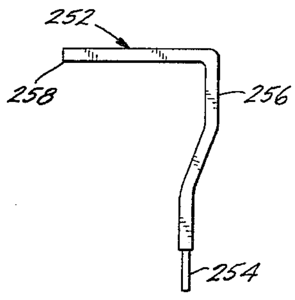
FIGURE 25 is a side view of a component of the restoration mechanism contemplated in accordance with the invention.
Figure 26:
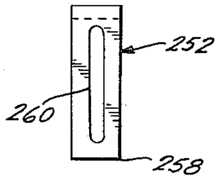
FIGURE 26 is a top view of the element of FIG. 25.

In FIGS. 25 and 26 it is seen that restoring bail 252 has generally the shape of the numeral seven and includes an end portion 254 adapted for connection in the armature of solenoid 250. Connected to end portion 254 is an intermediate portion 256 at the top of which is rigidly positioned a generally horizontal and flat upper section 258. Upper section 258 is provided with an elongated rectilinearly shaped slot 260.

In FIG. 6 it will be noted that arms 206 of hammers 198 are generally aligned in coplanar fashion. The upper section 258 of restoring bail 252 is superposed with respect to arms 206 and is normally spaced therefrom by a distance which permits hammers 198 to move pins 160 freely into active position. Should any of pins 160, however, become stuck during a punching operation, restoring bail 252 is available to force arms 206 back into rest position whereby no interference with the movement of the tape is possible. It will be noted that pins 160 extend through slot 260 in the upper section 258 of restoring bail 252.

In operation, it is preferred that solenoid 250 be actuated immediately following each punching operation. Thus, solenoid 250 cyclically pulls restoring bail 252 downwardly so that arms 206 are restored to their respective normal positions of rest.

Following each punching operation, the paper tape must be stepped in order to present the next sequential data recording zone to the punching pins for the recording of data. This is, per se, a conventional operation which, however, is uniquely effected in accordance with a further feature of the invention.

The tape drive mechanism, according to the invention, comprises a sprocket wheel 262 mounted on a shaft 264 for rotation therewith. The details of sprocket wheel 262 are best seen in FIGS. 27 and 28.

Figure 27:
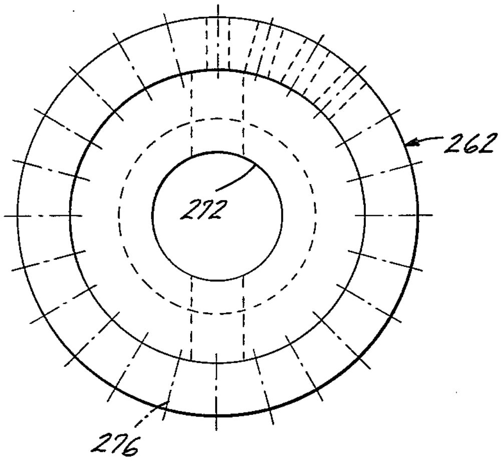
FIGURE 27 illustrates diagrammatically a sprocket wheel employed in the punch of the invention for purposes of driving a tape therein.
Figure 28:
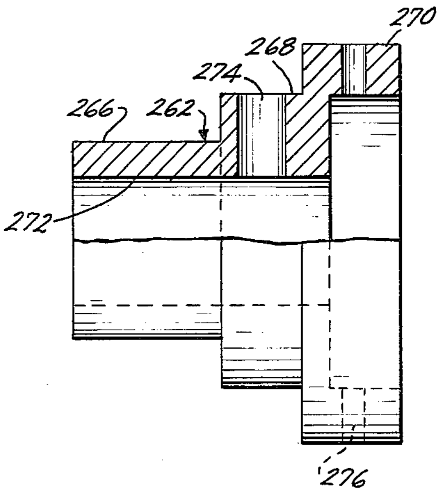
FIGURE 28 is an axial sectional view of the sprocket wheel of FIG. 27.

According to FIGS. 27 and 28, the sprocket wheel 262 of the punch of the invention comprises stepped sections 266, 268 and 270. Section 266 is generally provided with a bore 272 in which shaft 264 is accommodated. Section 268 is provided with a radially aligned hole 274 which accommodates a set screw or pin which fixes wheel 262 to shaft 264 for rotation therewith. Section 270 is provided with a plurality of equally spaced holes 276, the positions of which are diagrammatically illustrated in FIG. 27, holes 276 accommodating pins by means of which the sprocket wheel engages in sprocket holes of the paper tape being processed. By way of example, the axes of holes 276 are spaced by about 15° about the axis of the sprocket wheel 262.

Figure 9:
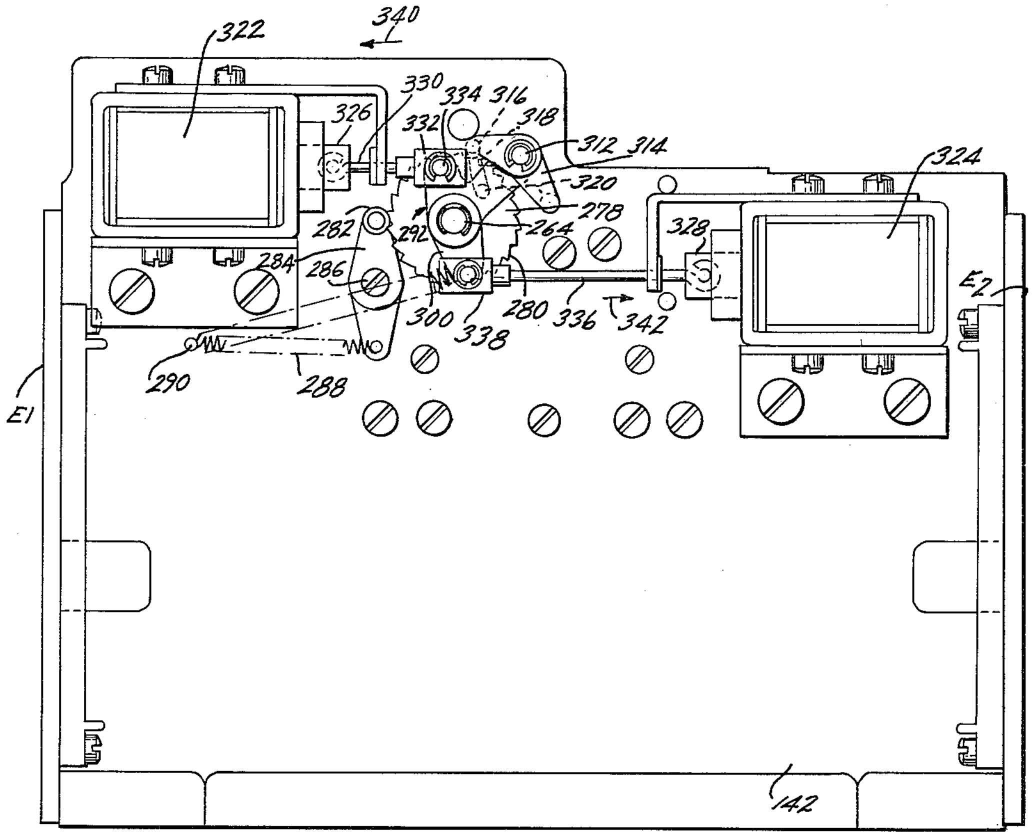
FIGURE 9 is a side view of the punch taken from the side opposite to that exposed in FIG. 6.
Figure 10:
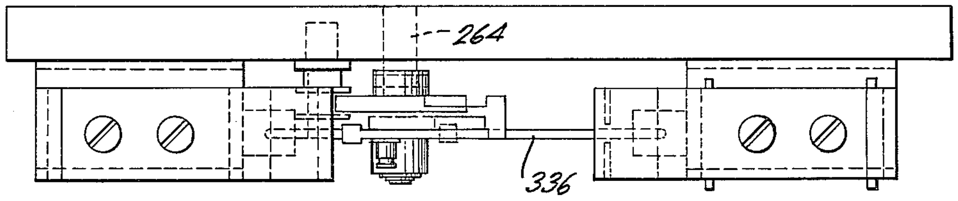
FIGURE 10 is a top view of the sprocket drive power source illustrated in FIG. 9.

Referring to FIGS. 9 and 10, it is next seen how shaft 264 is rotated for purposes of driving sprocket wheel 262, this drive constituting, as noted above, a further feature of the invention.

Mounted on shaft 264 is a saw-toothed ratchet wheel 278, the teeth 280 of which are in conventional manner sloped in the same general polar direction. Teeth 280 are engaged by a roller 282 mounted on a pivoted lever or detent 284 pivotable about a pin 286. Lever 284 is loaded by a spring 288 tending to urge roller 282 against the teeth 280 of ratchet wheel 278, the spring 288 being connected at one end to a pin 290 fixed to a side wall of the casing of the punch.

Figure 29:
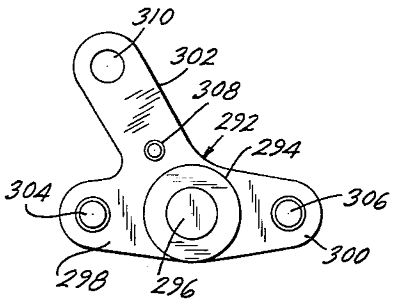
FIGURE 29 is a side view of a component of the tape drive assembly of the invention.
Figure 30:
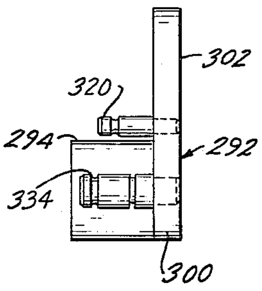
FIGURE 30 is an end view of the component of FIG. 29.

Loosely mounted for rotation about shaft 264 is a three-armed assembly 292, the details of which are best seen in FIGS. 29 and 30. In FIGS. 29 and 30 it can be seen that assembly 292 consists of a collar or bushing 294 which is provided with a bore 296 within which shaft 264 is loosely accommodated. The entire assembly is therefore freely pivotable upon said shaft.

It is further seen that assembly 292 consists of arms 298, 300 and 302, arms 298 and 300 constituting the means by which assembly 292 is driven. For this purpose, arms 298 and 300 are respectively provided with holes 304 and 306, the purpose of which will be hereinafter indicated. Arm 302 is provided with holes 308 and 310.

A pin 312 accommodated in hole 310 of arm 302 is employed to support pivotally a pawl 314. Pawl 314 carries a pin 316 to which is connected one end of a spring 318. The other end of spring 318 is connected to a pin 320 accommodated in hole 308 in arm 302 of assembly 292. The purpose of spring 318 is to urge the detent into engagement with teeth 280 of ratchet wheel 278.

Mounted on the casing of the punch are two additional solenoids 322 and 324 having a construction corresponding to that illustrated in FIGS. 16 and 17 and under certain circumstances having like electrical and mechanical parameters. Solenoids 322 and 324 are respectively provided with displaceable armature members 326 and 328. Armature 326 is connected by a rod 330 and turnbuckle 332 to a pin 334 accommodated in hole 304 in arm 298 of assembly 292, whereas armature 322 is connected to arm 300 by means of rod 336 and turnbuckle 338. Solenoids 322 and 324 are operated such that rods 330 and 336 move simultaneously in opposite directions as, for example, indicated by arrows 340 and 342. Solenoids 322 and 324 thus constitute complementary drive members of the paper tape drive provided in accordance with the invention. It is, of course, obvious to those skilled in the art that different numbers of solenoids may be employed according to the particular requirements of any given punch design.

Movement of rods 330 and 336 is transmitted via assembly 292 and pawl 314 to ratchet wheel 278. Rotation of ratchet wheel 278 is imparted to shaft 264 which in turn drives sprocket wheel 262, the sprocket wheel driving the tape being processed.

In addition to the above indicated components, the apparatus of the invention further comprises a tape tensioning arm 344 pivoted on pin 346 fixed to the casing, arm 344 being loaded by spring 348 connected to said casing. The upper extremity 350 of arm 344 is displaceable with the arm relative to the top plate 144 under the influence of a link 352 pivoted on pin 354 and loaded by spring 356. Extremity 350 constitutes an appropriate drag on the tape to tension the tape between the extremity 350 and the sprocket wheel 262.

Further, the invention employs a transparent cage 358 to collect the bits of paper punched from the tape by pins 160.

Still further, the invention contemplates the use of a grooved guide member 360 adjacent the sprocket wheel and having a slot therein corresponding to the sprocket wheel, guide member 360 serving to hold the tape in position for engagement by the pins of the sprocket wheel.

Finally, there is provided a knurled knob 362 for manual rotation of shaft 264 to provide a manual adjustment for the tape.

The overall operation of the apparatus is as follows. The pressing of a kay 40 (FIG. 2) of a typewriter, such as illustrated in FIG. 3, or in any other type of keyboard, operates through the photoelectric system 92 (FIG. 5) to actuate selected of the electromechanical transducers substantially constituted by solenoids 174. Accordingly, selected hammers 198 in FIG. 6 are pivoted to actuate corresponding pins 160 whereby the associated tape is punched. The actuation of any of solenoids 174, except that solenoid associated with the sprocket hole punch pin, causes the transmission of a signal as diagrammatically illustrated in FIG. 5 and possibly via a delay device 116 to the solenoid associated with the sprocket hole punch 160.

In sequence, a signal is then fed to solenoid 250 (FIG. 6) to operate bail 252 to restore hammers 198 to rest position, following which a signal is fed to solenoids 322 and 324 simultaneously to effect a tape stepping operation through the intermediary of ratchet wheel 278, shaft 264 and sprocket wheel 262.

Attention is directed to the fact that in the above apparatus all mechanical motion effected through a drive is made possible by the use of solenoids or electromechanical transducers adapted for producing a simple rectilinear force. These solenoids are very reliable components which are readily replaced, adjusted, and maintained.

It will further be noted that the solenoids require very little space compared to the electric motors and coupling mechanisms of conventional mechanisms which are replaced, the space occupied by the solenoids being further adapted to the relatively small breadth of punching pin alignment by means of uniquely constructed hammers.

Despite the fact that a rotary drive is employed in connection with a sprocket wheel, the necessary rotary force originates as a simple rectilinear force also provided by solenoids.

It is an inherent advantage of the invention that the specific solenoids employed are readily controlled by simple signals of the binary type (i.e., by the presence or absence of a signal or by two levels of magnitude alone).

The components of the punch are of a generally inexpensive type and are readily available by means of mass production techniques. Accordingly, the invention provides for lowered cost to the consumer.

There will now be obvious to those skilled in the art many modifications and variations of the structures and systems set forth above. These modifications and variations will not, however, depart from the scope of the invention if defined by the following claims.

What is claimed is:

1. Tape punch apparatus comprising parallel pins displaceable to punch said tape and arranged in a rectilinear alignment of determinable breadth, a bank of solenoids on one side of the alignment of pins, said bank being parallel to and of substantially greater breadth than said alignment of pins, said solenoids including armatures displaceable transversely of said alignment of pins, said pins being provided with lateral openings, hammers coupling said armatures to said pins for actuating the latter, said hammers each including spaced perpendicularly disposed first and second arms and connecting members rigidly connecting the arms, means pivotally supporting said hammers with the first arms in parallel and with the second arms in parallel, and springs coupled to said hammers and urging the same towards respective rest conditions, said first arms being aligned with and coupled to said pins, said second arms being aligned with and coupled to said armatures, said connecting members being of different lengths to compensate for different distances of said armatures relative to the associated pins due to the different breadths of said bank and the alignment of pins.

2. Apparatus for punching a paper tape comprising an upper die section defining a rectilinear alignment of parallel circular holes, a lower die section rigidly connected to the upper section and defining two groups of holes corresponding to and coaxial with the first said holes, pins of generally elongated cylindrical shape displaceable along their respective axes through said holes to punch a tape passing between said sections, said pins being arranged in a rectilinear alignment of determinable breadth, banks of solenoids on opposite sides of the alignment of pins at substantially equal distances from the latter, said banks being parallel to and of substantially greater breadth than said alignment of pins, said solenoids including armatures displaceable transversely of said alignment of pins, said pins being provided with lateral openings, hammers adapted for coupling said armatures to said pins for actuating the latter, said hammers each including spaced perpendicularly disposed first and second arms and connecting members rigidly connecting the arms, means pivotally supporting said hammers with the first and second arms respectively in parallel, said first arms being aligned with said pins, said second arms being aligned with said armatures, said connecting members being of different lengths to accommodate different distances of said armatures relative to the associated pins due to the different breadths of said banks and the alignment of pins, said first arms including circular terminal portions engaging in said lateral openings for displacing said pins, combs guiding said first arms in planes parallel to said pins, rods pivotally connected to said armatures, turnbuckles threadably engaging said rods and pivotally connected to said second arms, said solenoids defining parallel axes perpendicular to said pins, a further solenoid having an axis perpendicular to the axes of the first said solenoids and including an armature displaceable in parallel to said pins and a restoring bail connected to the latter said armature and displaceable therewith, the restoring bail including a first section disposed to engage said first arms and having a slot accommodating said pins and a second section coupling said first section to the latter said armature whereby said first arms can be urged toward a predetermined position.

3. Punch apparatus for punching a paper tape comprising an upper die section defining a rectilinear alignment of parallel circular holes, a lower die section rigidly connected to the upper section and defining two groups of holes corresponding to and coaxial with the first said holes, pins of generally elongated cylindrical shape displaceable along their respective axes through said holes to punch a tape passing between said sections, said pins being arranged in a rectilinear alignment of determinable breadth, banks of solenoids at substantially equal distances on opposite sides of the alignment of pins, said banks being parallel to and of substantially greater breadth than said alignment of pins, said solenoids including armatures displaceable transversely of said alignment of pins, said pins being provided with lateral openings, hammers adapted for coupling said armatures to said pins for actuating the latter, said hammers each including spaced perpendicularly disposed first and second arms and connecting members rigidly connecting the arms, means pivotally supporting said hammers with the first and second arms respectively in parallel, said first arms being aligned with said pins, said second arms being aligned with said armatures, said connecting members being of different lengths to accommodate different distances of said armatures relative to the associated pins due to the different breadths of said banks and the alignment of pins, said first arms including circular terminal portions engaging in said lateral openings for displacing said pins, combs guiding said first arms in planes parallel to said pins, rods pivotally connected to said armatures, and turnbuckles threadably engaging said rods and pivotally connected to said second arms.

4. Apparatus for processing a paper tape comprising a die for receiving said tape, a plurality of parallel punches operatively associated with said die and displaceable with respect thereto for punching said tape, a plurality of solenoids adapted to generate mechanical forces transversely of said punches, mechanical linkages coupling said solenoids to said punches for displacing the latter at right angles to said forces between rest and punch positions, one of said punches being a sprocket hole punch, a restoring bail operatively coupled to said linkages and effective through the latter to restore said punches to the rest position from said punch position, a further solenoid coupled to said restoring bail to operate the same in parallel to said punches, a sprocket wheel operatively disposed with respect to said tape for engaging sprocket holes therein and moving said tape through said die, a ratchet wheel, a shaft connecting said ratchet wheel to said sprocket wheel, a pawl operatively disposed with respect to said ratchet wheel whereby the ratchet wheel and thereby said sprocket wheel are rotatable in one direction only, an assembly including three rigidly interconnected arms rotatable on said shaft, an element on one of said arms engaging said ratchet wheel for driving the same in said one direction, tape drive solenoids coupled to the other of said arms to reciprocate the same on said shaft to drive said ratchet wheel, means for selectively actuating the first said solenoids and thereby selected of said punches, means responsive to the actuation of the latter said punches, to actuate said sprocket hole punch, means responsive to actuation of said sprocket hole punch to actuate said further solenoid and thereby said restoring bail, and means responsive to actuation of said restoring bail to actuate said tape drive solenoids and thereby drive said tape.

References Cited in the file of this patent

UNITED STATES PATENTS

| | | |
|---|---|---|
| 1,878,643 | Recke | Sept. 20, 1932 |
| 1,969,045 | Smith | Aug. 7, 1934 |
| 2,377,801 | Mills et al. | June 5, 1945 |